July 22, 1941.　　　　　C. HUMMEL　　　　　2,250,225
APPARATUS FOR THE PRODUCTION OF COVERS, PARTICULARLY FOR
CONSERVE CONTAINERS, COMPRISING RIP STRIPS
Filed Oct. 17, 1938　　　　9 Sheets-Sheet 1

July 22, 1941.　C. HUMMEL　2,250,225
APPARATUS FOR THE PRODUCTION OF COVERS, PARTICULARLY FOR
CONSERVE CONTAINERS, COMPRISING RIP STRIPS
Filed Oct. 17, 1938　9 Sheets-Sheet 3

FIG.12

July 22, 1941.                C. HUMMEL                    2,250,225
   APPARATUS FOR THE PRODUCTION OF COVERS, PARTICULARLY FOR
      CONSERVE CONTAINERS, COMPRISING RIP STRIPS
                    Filed Oct. 17, 1938           9 Sheets-Sheet 5

Inventor:
Charles Hummel
By
Sommers & Young
Attys

July 22, 1941.　　　　C. HUMMEL　　　　2,250,225
APPARATUS FOR THE PRODUCTION OF COVERS, PARTICULARLY FOR
CONSERVE CONTAINERS, COMPRISING RIP STRIPS
Filed Oct. 17, 1938　　　　9 Sheets-Sheet 6

FIG. 20

Inventor:
Charles Hummel.
By Sommers & Young
Attys

Patented July 22, 1941

2,250,225

UNITED STATES PATENT OFFICE 2,250,225

APPARATUS FOR THE PRODUCTION OF COVERS, PARTICULARLY FOR CONSERVE CONTAINERS, COMPRISING RIP STRIPS

Charles Hummel, Niederuzwil, Switzerland, assignor to the firm Buhler Brothers, Uzwil, Switzerland Application October 17, 1938, Serial No. 235,540
In Switzerland October 18, 1937

9 Claims. (Cl. 113—15)

This invention relates to an apparatus for the production of covers, particularly for conserve containers, comprising an outer cover rim and an inner cover plate having disposed between them a rip-strip soldered in place, serving for separating the two cover parts by pulling said rip-strip from between the two cover parts.

In the operation of the apparatus according to the invention, a wire blank of proper length for formation into a rip-strip is drawn from a supply source and automatically cut to proper length, whereupon in automatic continuous operation, this wire blank has one end formed into a looped handle, its remaining portion formed into an annular insert adapted to be placed between the two parts of the cover; the two parts of the cover to be joined are provided with soldering flux, the rip-strip is placed with its annular inserting portion in the cover rim and the cover plate is set in position; and then the joint is heated for effecting the soldering, and subsequently cooled by means of an air blast.

This makes possible in comparatively simple manner production of covers of the kind hereinbefore described in continuous operation and in dependable manner.

The working operations following the production of the rip-strip can also be carried out in automatic manner, for the purpose of mechanically producing covers of the kind hereinbefore described in continuous operation without resorting to any hand labor.

The apparatus is illustrated by way of example only with reference to the accompanying drawings which illustrate (partly schematically) an embodiment of apparatus according to the invention for producing covers provided with rip-strips.

Figure 1:
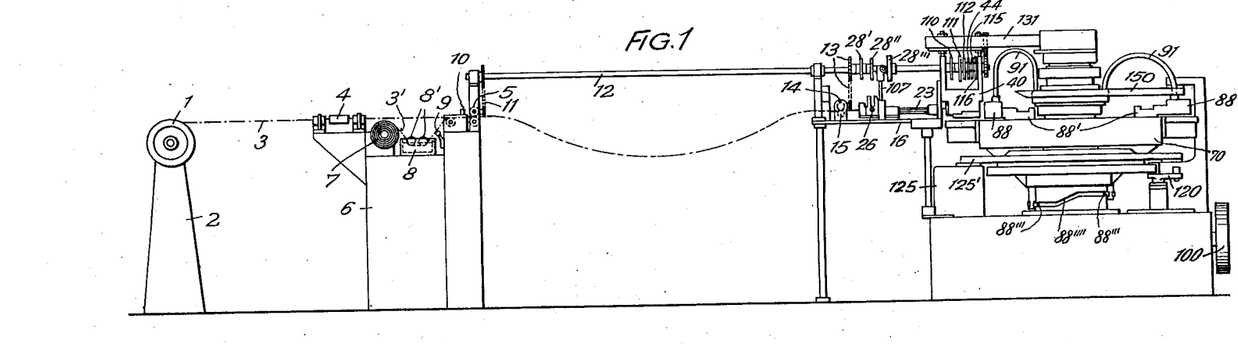
Fig. 1 is an elevational view of a machine according to the invention.
Figures 2, 3A:
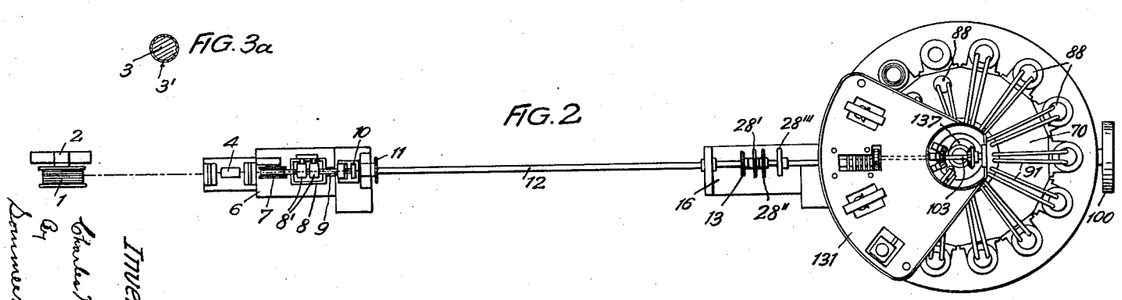
Fig. 2 is a corresponding plan view.
Fig. 3a is a cross sectional view of the supply wire enveloped by a soldering foil.

Referring to Figs. 1 and 2 of the drawings, the numeral 1 designates a roll of wire stock which is revolubly mounted on a standard 2 and supplies the wire 3 necessary for producing the work blanks to be formed. The supply wire 3 passes through a straightening device 4 known per se having oppositely disposed jaws and delivering the wire 3 in straightened condition, whereupon the wire arrives at a conveying device 5 operating by means of rollers. The straightening device 4 and the conveying device 5 are arranged on a supporting structure 6 on which a supply roll 7 is mounted which furnishes a soldering foil 3' to be applied to the wire 3, as shown on a larger scale in Fig. 3a.

The band-shaped soldering foil is passed from supply roll 7 through a bath 8 of soldering flux by means of rollers 8'. A wiper 9 removes surplus flux from soldering foil 3' prior to this foil passing through a shaping orifice 10 arranged on the supporting structure 6 in advance of conveying device 5. The wire 3 also passes through shaping orifice 10 and is wrapped up, in this orifice, in the soldering foil which to this end is transformed by the bore of the orifice, tapering in the direction of movement of the wire, from the band-shape into an annular or tubular shape adapted for enveloping the wire. The soldering foil 3', when leaving the shaping orifice 10 envelops the wire 3 snugly.

Figure 3:
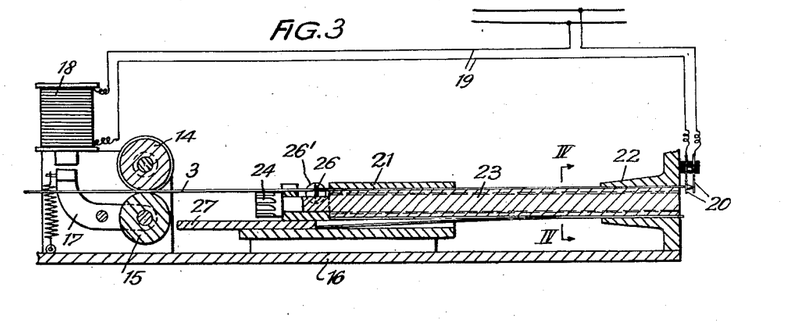
Fig. 3 is a larger scale sectional view taken on line III—III of Fig. 21 of means for feeding the supply wire and the individual work blanks cut therefrom.
Figures 4, 21, 22, 23, 24, 25:
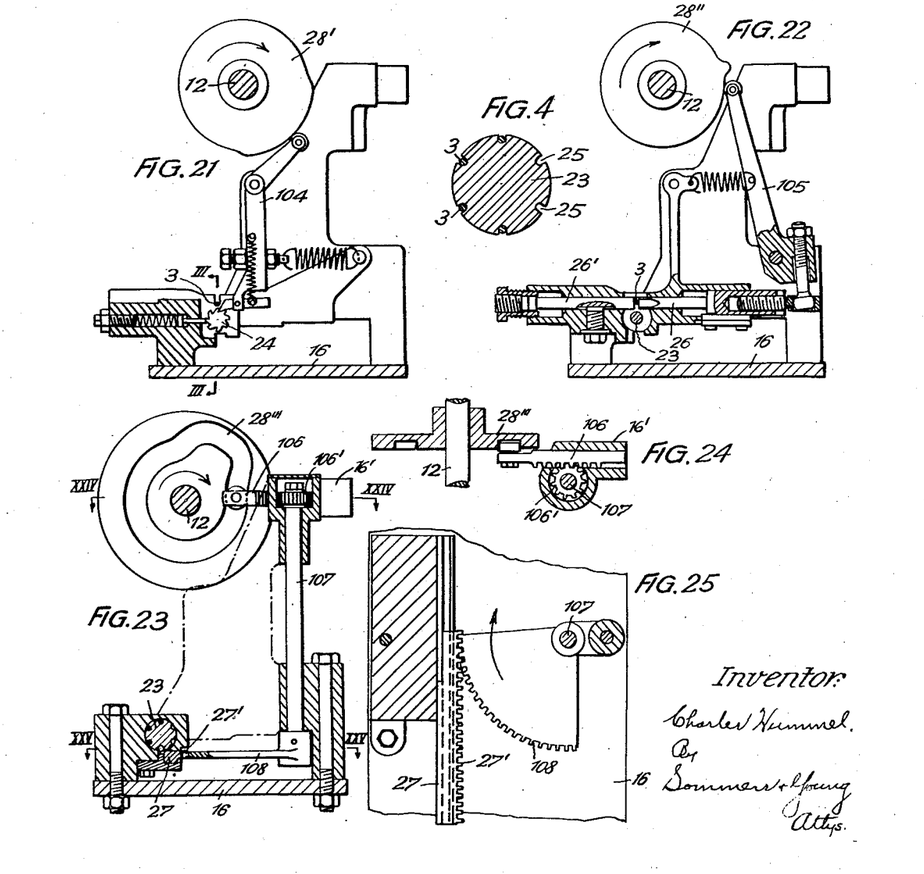
Fig. 4 is a cross section taken on line IV—IV of Fig. 3 on a larger scale.
Fig. 21 is a larger scale cross section of Fig. 20 taken through the drive shaft along line XXI—XXI.
Fig. 22 is a cross section of Fig. 20 taken through the drive shaft along line XXII—XXII.
Fig. 23 is a cross sectional view taken through the drive shaft along line XXIII—XXIII of Fig. 20.
Fig. 24 is a cross sectional view taken along line XXIV—XXIV of Fig. 23.
Fig. 25 is a cross sectional view taken along line XXV—XXV of Fig. 24.
Figure 20:
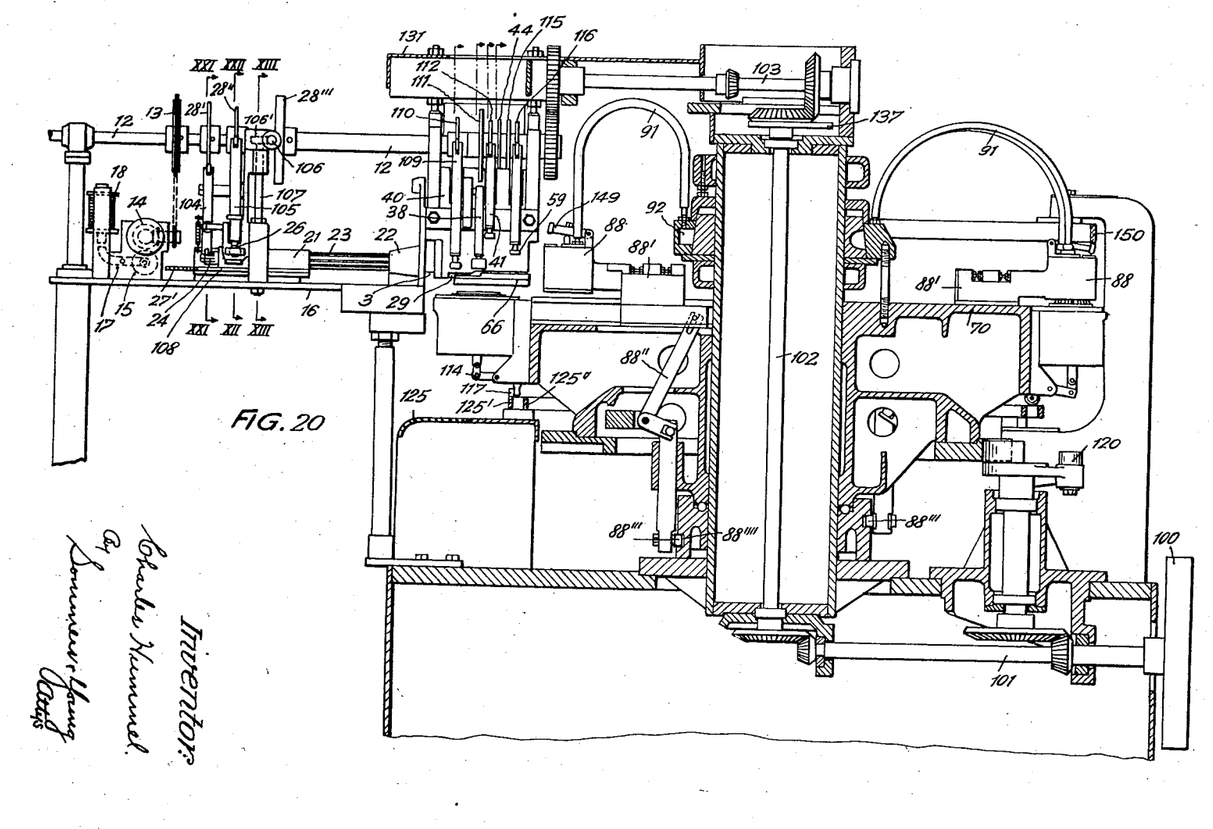
Fig. 20 is a vertical longitudinal section through the right half of Fig. 1 on a larger scale.

The conveying device 5 is continually driven by a shaft 12 by means of a chain drive 11, which shaft further drives a conveyor roller 14 (Figs. 1, 3, 20) to which a counter roller 15 is correlated, by means of a chain drive 13. Shaft 12 in turn is driven by a belt pulley 100 (Fig. 20) through the intermediary of transmission shafts 101, 102, 103 and intervening gear wheel drives. The conveying arrangement thus formed, between the rollers 14, 15 of which the wire provided with soldering foil is drawn, is arranged on a supporting structure 16. As shown in Figs. 3 and 20, the roller 15 is mounted on a lever 17 which forms at the same time the armature of a magnet coil 18 the current supply loop 19 of which can be closed by a contact spring 20. A roller 23 is mounted on supporting structure 16 by means of two bearings 21, 22 and carries on a reduced end portion a driving pinion 24. The circumference of the thicker portion of the roller 23 is provided with longitudinal grooves 25 (Fig. 4). The roller 23 constitutes a transfer device for lengths of wire cut from the supply wire 3.

The supply wire advanced by the conveying arrangement 14, 15 enters a straight longitudinal groove 25 of the roller 23 being situated in its path of movement. On leaving the opposite end of roller 23 the wire meets with contact spring 20, thereby closing the circuit of magnet coil 18 which is thus energized so as to attract lever armature 17, so that counter roller 15 is retracted from conveyor roller 14 and the advance movement of the wire is thus stopped, at this point. The conveying device 5 delivers a supply, that is, replenishes the supply of wire enveloped by soldering foil continually.

Thereupon, the portion 3" of supply wire accommodated in roller 23 is severed by a cutting device 26, which wire portion 3", as will be seen, is given a predetermined length sufficing for forming a wire appurtenance for the intended purpose. By rocking roller 23 step by step (commensurate with the number of longitudinal grooves 25 uniformly distributed over the circumference) the wire portion 3" or form blank is moved into another plane of feeding, that is, into the path of a slide 27 provided with a rack portion 27' (Figs. 23, 25), in which way contact spring 20 is liberated again and, therefore, conveying arrangement 14, 15 is rendered effective anew. The operation of cutting device 26 and that of roller 23 are automatically derived from shaft 12 which for this purpose as well as for the actuation of further working parts is provided with a plurality of control disks 28.

The step by step movement of transfer roller 23 is derived from a cam 28' (Figs. 1, 2, 20) on shaft 12 through the intermediary of a bell crank lever 104 which is periodically rocked by this cam so as to advance pinion 24 one step at each rocking movement by means of a spring-loaded pivotal latch carried by the outer end of lever 104 (Fig. 21).

The drive of the cutting device which consists of a pusher-like cutting member 26 is derived from a cam disk 28" on shaft 12 by means of a pivot arm 105 which is urged against disk 28" at one end and operatively connected at the other end with the cutting member for reciprocating the same relative to a backing member 26' for cutting the wire 3 between these two members (Fig. 22).

Slide 27 is periodically reciprocated by a cam disk 28''' on shaft 12 by means of a rack 106 (Figs. 23, 24) mounted to slide in a frame 16' supported on supporting structure 16 in the radial direction of this cam disk and cooperating with a transmission shaft 107 by means of a pinion 106' carried by the upper end of this shaft. To the lower end of shaft 107 is connected a toothed sector 108 (Figs. 23, 25) intermeshing with rack portion 27' of slide 27, so as to reciprocate same in time with rack 106.

Figure 26:
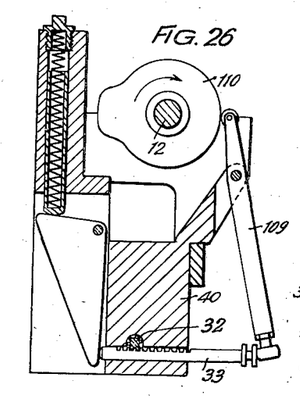
Fig. 26 is a larger scale cross sectional view taken through the drive shaft at 110 of Fig. 20.
Figure 27:
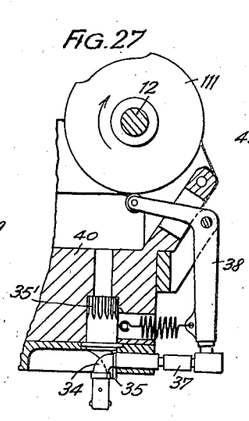
Fig. 27 is a cross sectional view taken through the drive shaft at 111 of Fig. 20.

The wire form blank 3" severed from the supply wire is passed to a mandrel 29 (Figs. 5 and 7 to 9 and 20) by means of slide 27 which mandrel is provided with a central bore for the passage of this form blank and is divided at its other end, by means of an incision, into two jaws 29'. This incision merges into a longitudinal slot of mandrel 29 communicating with the central bore thereof (Fig. 7). Mandrel 29 is provided with an exterior toothed portion 30 for cooperation with a gear wheel 31 which is firmly connected to a pinion 32 (Figs. 5, 26) which meshes with a rack 33 which is reciprocated by shaft 12 by means of a two-armed lever 109 to a block 40 (Figs. 6, 20, 26 to 29) and cooperating with a cam disk 110 on shaft 12. In Figs. 1 and 20 block 40 is shown to depend from an overhead structure 131 of the machine.

Figure 6:
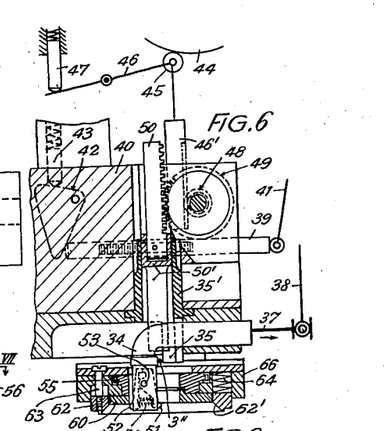
Fig. 6 is a vertical section taken on the line VI—VI of Fig. 5.
Figure 7:
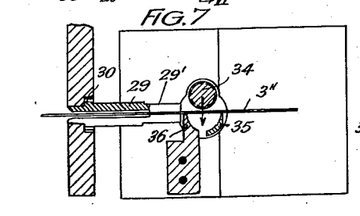
Fig. 7 is a horizontal section taken on the line VII—VII of Fig. 5.
Figure 8:
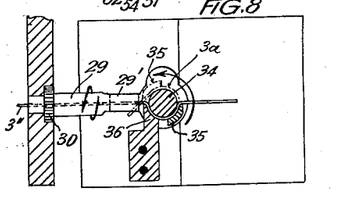
Figs. 8 and 9 are views similar to Fig. 7 with certain movable parts in different positions.

The form blank 3″ leaving the front end of mandrel 29 is pushed through between a shaping member 34 of cylindrical cross section on the one hand and two shaping dies 35, 36 on the other hand (Fig. 7). Shaping member 34 is provided with a horizontal arm which projects angularly thereto (Figs. 6 and 27) and is engaged by a traversing bar 37 which is connected with a pivotal control lever 38 operated by shaft 12 by means of a cam disk 111. As shown in Fig. 8, shaping member 34 has been displaced out of the position shown in Fig. 7, in the direction of the arrow, by which means a semi-circular bend (portion of half-ring shape) was formed in the work blank 3″ resting against the dies 35, 36. Die 35 is movably arranged and is displaced at times, as will be hereinafter explained, whereas die 36 is immovable.

Figures 9, 10, 11:
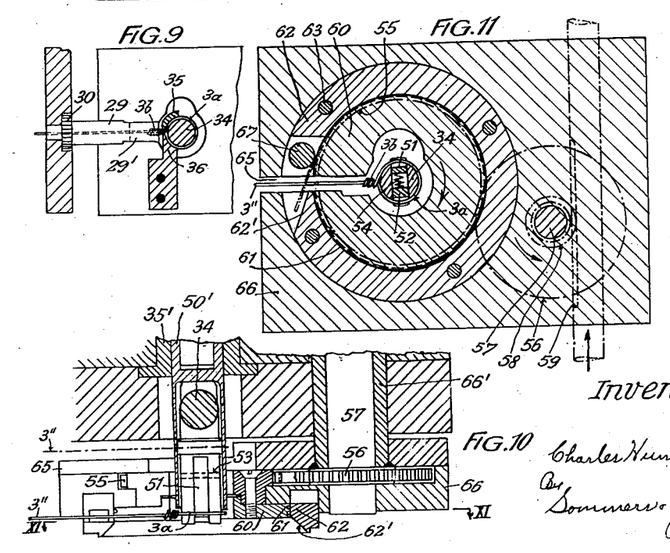
Fig. 10 is a larger scale vertical section of means for forming the annular inserting portion on the work blank.
Fig. 11 is a horizontal section on the line XI—XI of Fig. 10.

In Fig. 9, die 35 is shown to have moved through an approximately semi-circular range about shaping member 34 from its position shown in Fig. 8, so that the semi-circular bend previously formed in the blank 3″ is transformed into a circular ring 3a encompassing shaping member 34 and serving as a handle. The corresponding second end position of movable die 35 is shown in chain-dotted lines in Fig. 8, as well as the corresponding end of the form blank 3″. This end of the wire piece 3″ is now entered into the incision of mandrel 29 between the jaws 29′. Thereupon, mandrel 29 which now serves as a clamp for the wire piece performs several turns, so that the said end of the wire piece 3″ is wound about the rectilinear part of the mandrel projecting therefrom and is thus fixed to this part at 3b, as indicated in Fig. 9 and more clearly shown in Fig. 11. By this means the respective end portion of the wire piece 3″ is formed into a firmly closed looped or loop-shaped handle.

Figure 28:
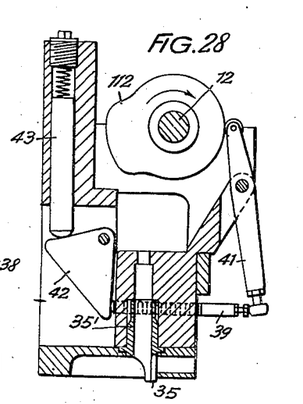
Fig. 28 is a cross sectional view taken through the drive shaft at 112 of Fig. 20.

Movable die 35 which returns into initial position at a later time, as well as shaping member 34, is positioned at the lower end of a sleeve 35′ the upper end of which cooperates with a displaceably guided rack 39 by means of a circumferential toothed portion (Figs. 6 and 28). Sleeve 35′ and rack 39 are both arranged in the block 40 in which are also mounted mandrel 29, gear wheel 31, pinion 33 and shaping member 34. Rack 39 is reciprocated by shaft 12 by means of a two-armed lever 41 pivotally connected to block 40 and cooperating with a cam disk 112 on this shaft (Fig. 28). The other end of rack 39 is influenced by a spring-loaded bolt 43 by means of a rocking member 42 (Figs. 6 and 28).

Figure 29:
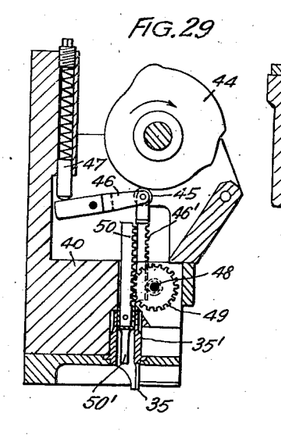
Fig. 29 is a cross sectional view taken through the drive shaft at 44 of Fig. 20.

As shown in Figs. 6 and 29, a two-armed lever 46 provided with a guide roller 45 is controlled by a cam disk 44, rotated by shaft 12, one arm of this lever cooperating with a spring-loaded bolt 47, and the other arm of this lever engaging with a rack 46′ displaceably guided in block 40 for cooperation with a pinion 48 which rotates in unison with a gear wheel 49 and is mounted on a common shaft together with this gear wheel which in turn intermeshes with a vertically displaceable rack 50. Rack 50 carries at its lower portion a pusher 50′ which is received in sleeve 35′ and serves for shifting looped handle 3a on shaping member 34 downwardly in the direction toward a pair of claws 51, 52 which are provided on this member and mounted on a common pin 53, and the free ends of which are forced asunder by a spring 54.

Figure 5:
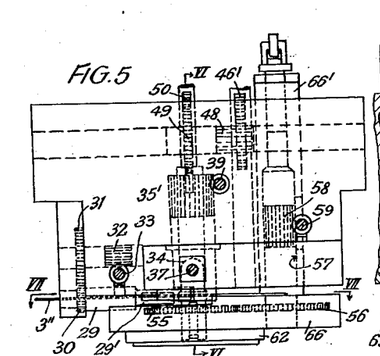
Fig. 5 is an elevation of means for forming the looped handle on the work blanks after having been cut to a certain length.
Figure 30:
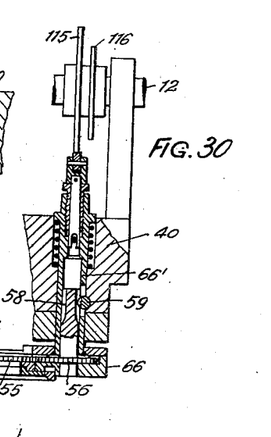
Fig. 30 is a cross section similar to Fig. 10 showing the drive of the means for forming the annular inserting portion on the work blank on a smaller scale.

Normally, embossed surfaces on the two claws 51, 52 project laterally from shaping member 34 to some extent through a slot in this member. The vertical part of shaping member 34 protrudes through an opening in the central portion of a gear wheel 55 intermeshing with a gear wheel 56 the mounting shaft 57 of which provides a pinion 58 cooperating with a rack 59 (Figs. 5, 11, 30). This rack is reciprocated by shaft 12 by means of a cam disk 116 in a manner similar to that shown for rack 39 in Fig. 28 for alternately rocking gear wheel 55 to the right and back into initial position, to the left. Firmly connected to gear wheel 55 is a disk 60 (Figs. 10, 11) the circumference of which is provided with a groove 61 having substantially helical shape and being closed toward outside over the major portion of the circumference of disk 60 by an annular stop member 62 which is vertically displaceably guided by means of screw studs 63 and forced downwardly by springs 64 distributed over the circumference of stop member 62 (Fig. 6).

Stop member 62 is provided at the side thereof adjacent to the side of mandrel 29, toward which the form blank 3″ of a predetermined length is advanced, with an aperture having an oblique face 62′ (Fig. 11). This aperture of the annular stop 62 lies within range of a slot 65 of a multipart body 66 in which the cooperating gear wheels 55, 56 and the stop member 62 are arranged. Slot 65 registers with slots which are provided in gear wheel 55 and in grooved disk 60, as shown in Figs. 10 and 11. Fig. 11 shows a bolt 67 to be arranged in the aperture of annular stop 62.

After the looped handle 3a has been formed on the wire piece 3″ of predetermined length, in the manner previously described, the wire piece is moved from its upper position shown in dotted lines in Fig. 10 into the lower full line position. To this end pusher 50′ shifts the looped handle 3a downwardly relative to the vertical part of shaping member 34 to a corresponding extent, so that the remaining portion of the wire piece passes out of the longitudinal slot of mandrel 29 to enter the slot of grooved disk 60 via slot 65 of body 66. In the lower position of the wire piece, the looped handle 3a thereof bears against the embossed lower ends of spring-loaded claws 51, 52 of shaping member 34. At this time gear wheel 55 is turned in the direction of the arrow in Fig. 11 to the right, so that wire piece 3″ is moved along by action of the respective limiting face of the slot provided in gear wheel 55, and the extension of the rectilinear portion of wire piece 3″ situated in the slot of grooved disk 60 is received in the circumferential groove 61 of disk 60 after having met with bolt 67, and is formed into a ring, the aforementioned annular insert, of a diameter corresponding to the diameter of grooved disk 60. In Fig. 11 the operation of inserting the wire piece past bolt 67 between grooved disk 60 and annular stop 62 is indicated in chain-dotted lines, and it will be understood that the end portions of the annular insert formed from the wire piece overlie each other. The wire appurtenance for insertion between the flat cover body portion and the cover rim, that is, the rip-strip is then preliminarily shaped.

Figure 12:
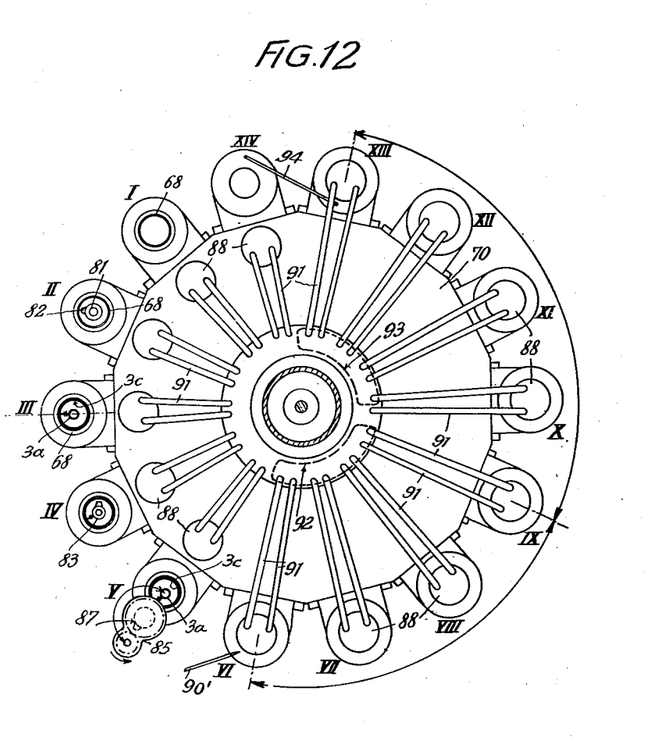
Fig. 12 is a plan view showing a rotatable table adapted to be moved step by step, and provided on its circumference with a number of heads, and having further means for placing the definitely shaped wire appurtenance between the cover body and the cover rim and for joining these parts together.
Figure 13:
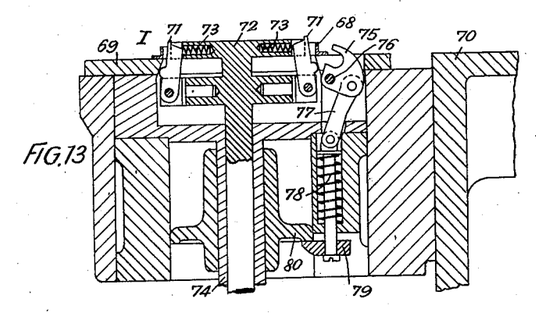
Fig. 13 is a vertical section through a head on the rotatable table.
Figure 31:
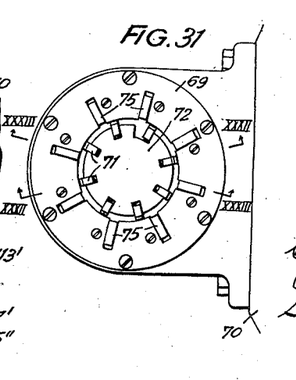
Fig. 31 is a plan view of a working head of the rotatable table.

As shown in Fig. 13, cover rim 68 bears against a supporting plate 69 arranged on the rotatable table 70 the circumference of which is provided with a plurality of heads which arrive successively at working positions I—XIV (Fig. 12) while the rotatable table is automatically moved step by step by drive pulley 100 through the intermediary of transmission shaft 101 and a so-called Maltese drive 120 known per se. Each head of the rotatable table is provided with a number of pivotal stop latches 71 which are mounted on a common displaceable member 72 and distributed over the circumference of this member at uniform distances apart (Fig. 31), and are urged against stationary guide surfaces by springs 73.

Figure 34:
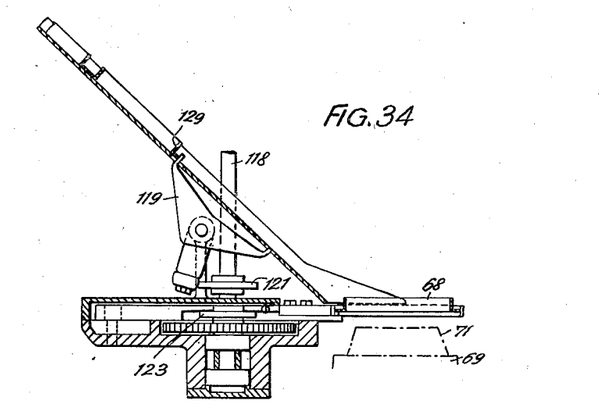
Fig. 34 is a sectional elevational view of a feed device.
Figure 35:
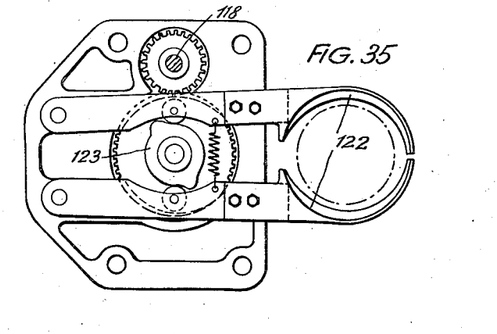
Fig. 35 is a sectional plan view of Fig. 34.

The cover rims 68 are conveyed from the stamping device (not shown) to working position I of the machine by an automatic feed device 129 (Fig. 34) delivering the cover rims individually one after the other in time with the feed steps of rotatable table 70. This feed device is controlled by a shaft 118 which is driven in time with the advance movement of table 70 so that a two-armed feed pawl 119 alternately projecting on the path of a feed chute for the oncoming cover rims by a forward and a rearward finger releases the foremost cover rim on the chute by the forward finger while at the same time the succeeding cover rims are locked by the rearward finger against further advance movement. The foremost cover rim after having slid by its own weight into a horizontal position in which it is inserted between the correspondingly shaped arms of a pair of pincers drops down on the working head, then occupying working position I when the arms of the pincers 122 are spread apart by action of a cam 123 on shaft 118 and while the latches 71 of this working head are rocked inwardly as shown in Fig. 13. This figure also shows the latches 71 to project out of the top surface of the supporting plate 69 of the working head, as further indicated by chain dotted lines in Fig. 34, so that the cover rim 68 dropping down on plate 69 encompasses the latches 71.

Figure 32:
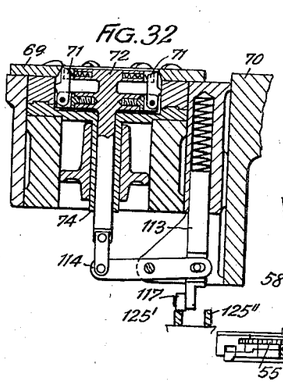
Fig. 32 is a section on the line XXXII—XXXII of Fig. 31.
Figure 33:
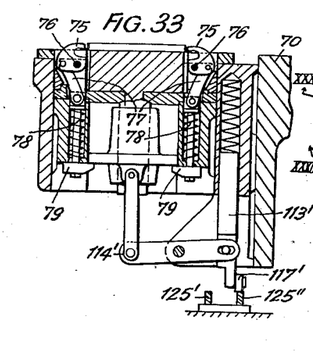
Fig. 33 is a section on the line XXXIII—XXXIII of Fig. 31.

The displaceable member 72 is displaceably arranged in a vertical guide 74 and is automatically advanced into the position shown in Fig. 13, and retracted from this position again. The vertical displacement of member 72 is controlled by a circular rail 125' resting against a support 125 (Figs. 1, 20, 32) and having a cam track on top of it for cooperation with a guide roller 117 urged against this track by a spring-pressed bolt 113 on the lower end of which the roller 117 is mounted and which is operatively connected by a linkage 114 to displaceable member 72 (Fig. 32). To the circumference of displaceable member 72 are correlated several clamping levers 75 uniformly distributed therearound (Fig. 31), and each of these levers has a fixed bearing pin 76 and is connected with a spring-pressed bolt 78 through the intermediary of a link 77, this bolt resting against a control member 80 by means of a disk 79. Control member 80 is common to all the bolts 78 and is mounted on the outer side of guide 74 provided for displaceable member 72 (Figs. 13 and 33). Control member 80 in turn is controlled by a circular rail 125" (Figs. 20, 33) resting against support 125 in concentric relation to rail 125' and having a curved guide track on top of it for cooperation with a guide roller 117' urged against this track by a spring-pressed bolt 113' on the lower end of which the roller 117' is mounted and which is operatively connected to control member 80 by a linkage 114'. Thus, when roller 117' descends, member 80 is raised, thereby liberating disks 79, so that clamping levers 75 are forced into operative position by spring-pressed bolts 78.

Figure 14:
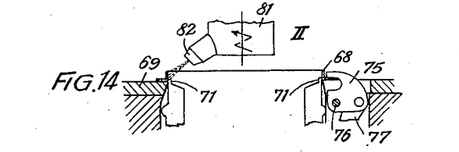
Figs. 14 to 18 are views illustrating various working operations, Figs. 15 to 18, inclusive, being drawn to a larger scale.

Whilst in Fig. 13, the individual clamping levers 75 are shown to be in inoperative position (due to control member 80 assuming a lowered position), a number of clamping levers are shown to be in operative position in Figs. 14 and 33. In this position of clamping levers 75, cover rim 68 is forced against supporting plate 69 by these levers bearing on the horizontal flange of the cover rim, whereas the vertical flange of the cover rim bears against the stop latches 71 which are retracted to a certain extent, regarding Fig. 13, and rocked outwardly, in which way, cover rim 68 is secured in position on the respective head of rotatable table 70, which is necessary for the succeeding working operations. By rotatable table 70 carrying out a feed step, rotatable cover rim 68 is moved from working position I into working position II at which a sparge device 81 providing a head piece for cooperation with the working heads of table 70 is arranged the nozzle 82 of which sprays the inside of the vertical flange of cover rim 68 with soldering flux, that is, that surface of the cover rim is sprayed with which the rip-strip will be connected. Sparge device 81 revolves about a vertical axis by action of a bevel gear drive 124 (Fig. 36) which in turn is actuated from the drive of the machine, so that cover rim 68 is sprayed with soldering flux throughout the whole inner circumference thereof, when the needle valve controlling the nozzle 82 is opened by action of a cam disk 127 lowering a flanged control member 128 relative to the device by means of which this valve is controlled through a linkage acting against spring pressure. The soldering flux is thus discharged from a reservoir 126 of the sparge device in time with the feed steps of rotatable table 70.

Figure 15:
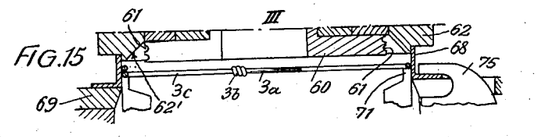

As rotatable table 70 carries out a further feed step, the cover rim is moved into working position III (Figs. 12, 15). At this position the preliminarily shaped rip-wire is inserted in the cover rim 68. To this end, the looped handle 3a of the rip-wire is pushed off shaping member 34 over the claws 51, 52 thereof by means of an additional length of traverse of pusher 50', and grooved disk 60 (inclusive of gear wheel 55) is advanced in the direction toward cover rim 68. Consequently, body 66 provided with a guide shank 66' (Figs. 5 and 30) is correspondingly displaced by shaft 12 by means of a control disk 115, and is subsequently restored into initial position in time with the feed movement of table 70.

As body 66 is lowered spring-pressed annular stop member 62 comes to bear on the upper edge of the vertical flange of cover rim 68. Due to relative movement between grooved disk 60 and annular stop member 62 the rip-wire is moved out of range of the cylindrical inner surface of annular stop member 62, and the annular inserting portion 3c of the rip-wire spreads (by action of inherent spring) within range of the conical surface 62' provided on member 62, and is thus guided toward cover rim 68 by said conical surface. By this means the rip-wire comes to bear on the upper ends of stop latches 71 within the inner side of the vertical flange of cover rim 68 (Fig. 15).

Figure 16:
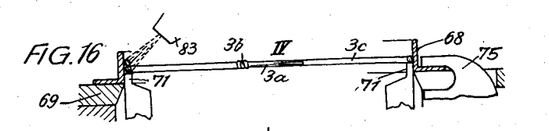

Due to the rotatable table being further advanced, cover rim 68 including the rip-wire is passed to working position IV (Figs. 12, 16). The inserting portion of the rip-wire is now sprayed with soldering flux by means of a sparge device 83 of equal construction as sparge drive 81 but arranged at working position IV so as to be adapted to rotate about its vertical axis in a manner similar to that described in connection with sparge device 81.

Figure 36:
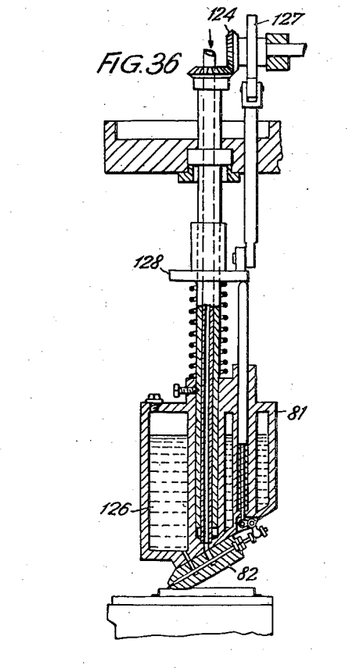
Fig. 36 is a vertical section of a head piece for cooperation with the working heads on the rotatable table.

Cover bodies 84 are advanced toward working position V of the machine (Figs. 12 and 17) by means of an automatic feed device 130 (Fig. 37) of a construction similar to that of device 129 previously described. Device 130 supplies a flat profiled cover body 84 to a rocking arm 85 at a time in synchronism with the feed movement of table 70. Rocking arm 85 which provides a further head piece is provided with a rotatable suction mouth piece 86 communicating with means for producing sub-atmospheric air pressure through a pipe stud 132 and inner passages 86', 85' and 132' of the mouth piece, the rocking arm and a fixed mounting member 133, respectively. By suction action of mouth piece 86 the cover body 84 being presented to the latter in a position of arm 85 remote from working position V is aspired by the mouth piece so as to be firmly held thereto. Thereupon arm 85 is rocked into working position V by a rack 134 cooperating with a pinion 135 (Fig. 37a) connected to the upper end of a shaft 136 fixed at its lower end to arm 85 and rotatably carried by member 133. Rack 134 is reciprocated in time with the advance movement of table 70 by a cam 137 on transmission shaft 102 (Figs. 2, 20 and 36).

Figures 37, 37A, 38, 39, 40, 41, 42:
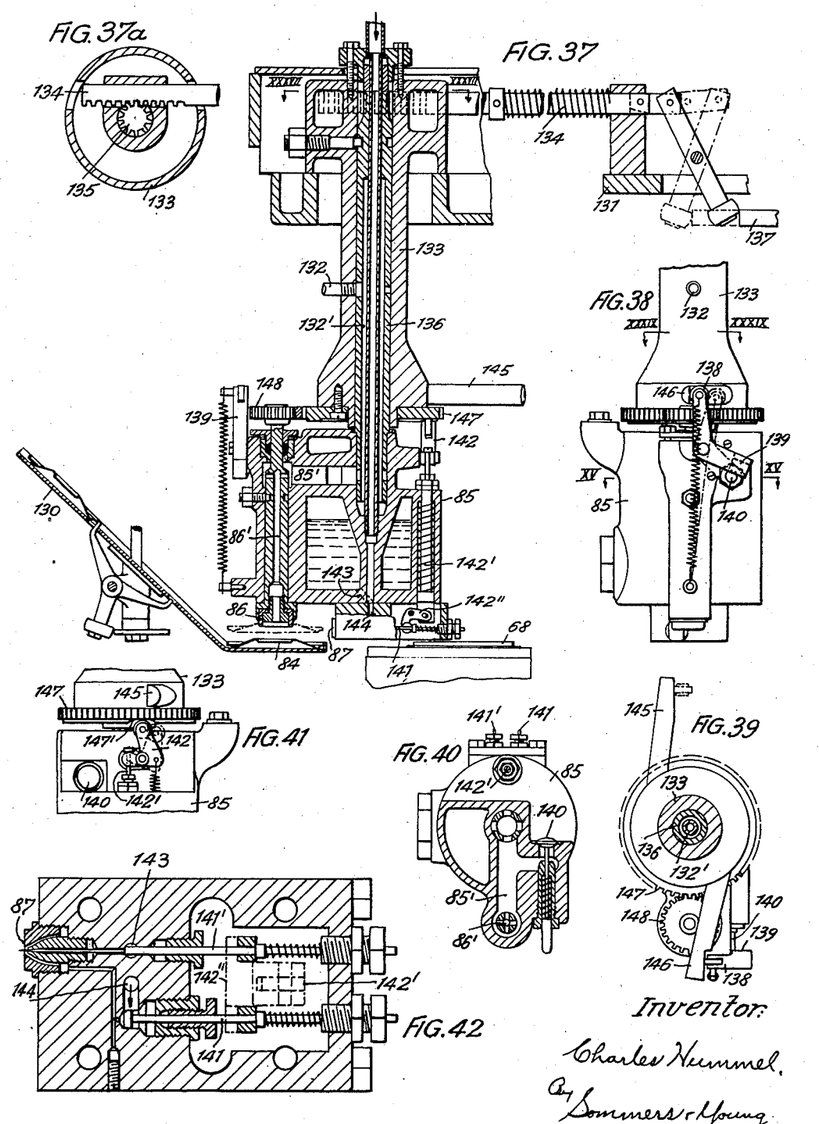
Fig. 37 is a vertical section of a further head piece.
Fig. 37a is a section along line XXXVIIa—XXXVIIa of Fig. 37.
Fig. 38 is a side elevation of Fig. 37.
Fig. 39 is a section along line XXXIX—XXXIX of Fig. 38.
Fig. 40 is a section along line XL—XL of Fig. 38.
Fig. 41 is another side elevation of Fig. 38.
Fig. 42 is a cross sectional view taken on line XLII—XLII of Fig. 37.

When table 70 advances from working position IV to working position V arm 85 rocks mouth piece 86 from its position shown in Fig. 37 into working position V, so that both parts arrive at position V at the same time. During this rocking movement of arm 85 mouth piece 86 performs a complete turn about its axis by the driving pinion 148 of the mouth piece rolling on the periphery of a stationary gear wheel 147. Simultaneously therewith a bell crank lever 142 (Fig. 41) pivoted to the circumference of arm 85 rides on a cam track on the lower end face of wheel 147 near the periphery thereof so that, when lever 142 lowers a connecting rod 142', a bell crank lever 142" pivoted thereto opens two needle valves 141, 141'. In this way, compressed air is supplied in the direction of the arrows shown in Fig. 37 through a passage 144 (Figs. 37, 42) into outer passages of nozzle 87, and soldering oil from an inner reservoir of arm 85 through a passage 143 into a central passage of this nozzle. Therefore, a spray of soldering flux is projected onto the outer side of the circumferential flange of cover body 84 until lever 142 enters a gap 147' in its cam track, in consequence of which, rod 142' is raised and valves 141, 141' are shut again.

Figure 17:
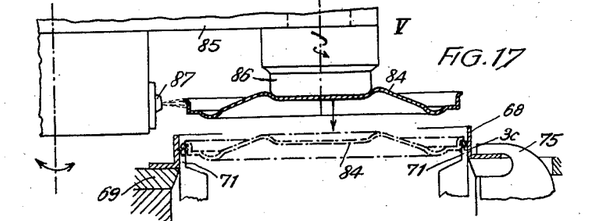

From Fig. 39 it will be observed that while pinion 148 makes a complete turn arm 85 rocks only through an angle of 180°, due to the diameter of wheel 147 being twice that of pinion 148. At the end of this rocking movement of arm 85, that is, on arrival of mouth piece 86 at working position V a bell crank lever 138 pivoted to the periphery of this arm hits a stop 146 on member 133 whereby this lever is rocked from the full line position of Fig. 38 into the chain dotted position, so that an inclined face 139 on the lower end of this lever rides across the outer end of the stem of a valve 140 (Figs. 38, 40) and thus the spaces of sub-atmospheric pressure are opened to the atmosphere. By this means cover body 84 drops down in proper manner into the hollow interior of cover rim 68 by action of its own weight, as shown in Fig. 17. In Fig. 17, cover rim 84 is indicated in chain-dotted lines in the position in which it rests against the annular inserting portion 3c of the rip-wire bearing on pivotal stop latches 71.

The straight portion of the rip-wire joining with the looped handle 3a of the latter is received in a pressed out radial depression (not shown) in cover body 84.

Figures 18, 19:
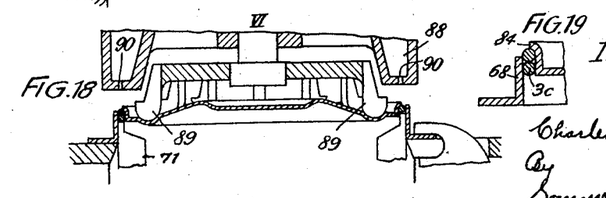
Fig. 19 is a partial section of Fig. 18 on a larger scale, showing the cover rim, the rip-strip and the cover body to be joined together.

For the purpose of inserting cover body 84, mouth piece 86, that is, rocking arm 85 may, if required, perform temporarily a corresponding downward movement prior to the suction effect on the cover body being interrupted. Rocking arm 85 then rocks back into initial position in order to receive a further cover body which it subsequently supplies to a cover rim arriving at working position V while the rotatable table carries out a further feed step. At the end of this return movement of arm 85 into initial position lever 138 hits a stop 145 on member 133 and is thus rocked back into its full line position shown in Fig. 38 so that valve 140 is closed again. By upward movement of the pivotal stop latches 71 these move the rip-wire in unison therewith, so that the annular inserting portion of the latter is raised to the upper edge of the vertical flange of cover rim 68, as shown in Fig. 18.

Figure 43:
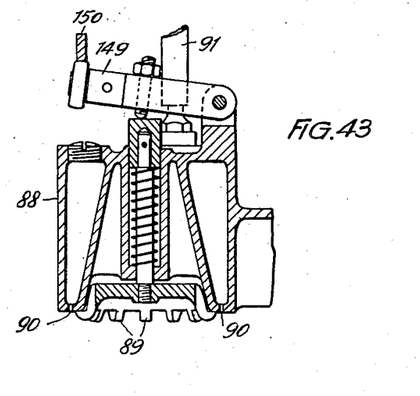
Fig. 43 is a vertical section of another head piece.

When the rotatable table 70 is further advanced, the cover rim is moved into working position VI together with the cover body having been inserted therein at working position V. At the former position a head piece 88 and a correlated press member 89 provided with projecting press fingers (Figs. 18, 43) is arranged above the heads of rotatable table 70. At each of the working positions VII, VIII and IX also a head piece 88 of this kind is arranged above the heads of the rotatable table 70. At working position VI the cover bodies 84 are firmly pressed against the annular inserting portions 3c of the rip-wires by the press members 89 which to this end are moved downward by a pivotal arm 149 on the head piece engaging under a guide rail 150 secured to upstanding supports therefor (Figs. 1, 20). As shown in Fig. 12, to working position VI is correlated a small pipe 90' connected with a gas conduit for producing an igniting flame. By means of the igniting flame all gas discharging through holes 90 (Figs. 18, 43) of the head piece 88 is ignited, the head piece thus serving as a burner at these portions. The flames of the burners form a ring of flames which are directed toward, that is, sweep the contacting portions of the circumferential flange of cover body 84, annular insert 3c of the rip-wire and the edge of the vertical flange of cover rim 68, as these portions oppose the head piece 88 (burners). In this way these portions are soldered to each other. The soldering operation is continued in similar manner at working positions VII, VIII and IX into which the assembled parts of the covers are successively moved by means of corresponding further feed steps of rotatable table 70.

To all of the working heads of rotatable table 70 is correlated an individual head piece 88 the radial distance of which from the rotation axis of the rotatable table is automatically so altered that at working positions XIV and I to V the individual head pieces 88 are moved out of range of the working heads of rotatable table 70. The retraction of head pieces 88 from the range of the working heads is effected by means of a slide 88' reciprocable by a bell crank lever 88" and a guide roller 88''' operatively connected thereto and cooperating with a cam groove 88'''' rotating together with table 70. At working positions VI—XIII the head pieces 88 remain above the working heads. To the individual head piece 88 two flexible feed conduits 91 are correlated. The feed conduits 91 of the head pieces 88 present at working positions VI to IX communicate with a common gas chamber 92.

On the completion of the soldering operation, the multi-part cover, having been formed in the manner described, is moved by the next feed step of rotatable table 70 from working position IX to working position X where cold air is projected by the head piece 88 through the holes 90 onto the soldered portion of the cover for cooling the same. This operation is repeated at the succeeding working positions XI, XII and XIII into which the cover is moved by further feed steps of rotatable table 70. Cold air is supplied to the head pieces 88 at working positions X to XIII from a common air chamber 93 through the feed conduits 91. During the next feed step of rotatable table 70 the respective head piece 88 is pulled radially inwardly relative to this table 70 while the work passes from position XIII to position XIV, whereby the finitely worked cover on the rotatable table is liberated and guided away from rotatable table in a lateral direction by a guide member 94.

Owing to the fact that in forming the annular insert on the work blank the ends of the latter overlie one the other, it is feasible after completion of the cover to tear off the cover body all around its circumference without the body separating from the rip-wire.

Naturally, instead of canisters for conserves, as referred to, canisters or the like for other purposes can be produced by means of the method described.

It is not essential that the operation of the device on the principle of the invention is carried out purely automatically. Under certain circumstances certain working operations may be effected by hand.

Various changes and modifications may be made in the practice of my invention without departing from the principle or spirit thereof, by adding customary practice and established knowledge of the art to the present disclosure and the scope of the appended claims is not to be regarded as limited except as specified therein.

What I claim is:

1. Apparatus for the production of can covers having outer rims and inner closure discs separable from the rim by tearing a rip-wire from between said rim and disc comprising means for feeding said wire from a roll of supply wire, means for cutting off pieces of said wire of predetermined length, means for temporarily stopping the feeding action of the feeding means when a piece of wire is cut off, means for forming an end portion of the piece of wire cut off into a grip loop, means for forming the remainder of said piece of wire into an insert ring having end portions overlapping each other, a turntable, having a pivoted stop latch and a clamping lever, the cover ring having an upright flange and a horizontal flange, said stop latch engaging the inner side of the upright flange and the clamping lever engaging said horizontal flange for supporting the rip-wire insert ring in the cover rim, means for placing the wire, so formed, with its insert ring between a closure disc and closure rim, and means for soldering said insert ring between said disc and rim.

2. Apparatus for the production of can covers having outer rims and inner closure discs separable from the rim by tearing a rip-wire from between said rim and disc comprising means for feeding said wire from a roll of supply wire, means for cutting off pieces of said wire of predetermined length, means for temporarily stopping the feeding action of the feeding means when a piece of wire is cut off, means for forming an end portion of the piece of wire cut off into a grip loop, means for forming the remainder of said piece of wire into an insert ring having end portions overlapping each other, a turntable having a rocking arm provided with a rotatable suction mouthpiece for carrying a cover disc to a cover ring at a point of operation, means for placing the wire, so formed, with its insert ring between a closure disc and closure rim, and means for soldering said insert ring between said disc and rim.

3. Apparatus for the production of can covers having outer rims and inner closure discs separable from the rim by tearing a rip-wire from between said rim and disc comprising means for feeding said wire of predetermined length from a roll of supply wire, means for cutting off pieces of said wire of predetermined length, means for temporarily stopping the feeding action of the feeding means when a piece of wire is cut off, means for forming an end portion of the piece of wire cut off into a grip loop, means for forming the remainder of said piece of wire into an insert ring having end portions overlapping each other, a turntable having a rocking arm provided with a rotatable suction mouthpiece for carrying a cover disc to a cover ring at a point of operation, means for rotating said mouthpiece, means for spraying solder flux on the periphery of said cover disc as said disc is rotated, means for placing the wire, so formed, with its insert ring between a closure disc and closure rim, and means for soldering said insert ring between said disc and rim.

4. Apparatus for the production of can covers having outer rims and inner closure discs separable from the rim by tearing a rip-wire from between said rim and disc comprising means for feeding said wire from a roll of supply wire, means for cutting off pieces of said wire of predetermined length, means for temporarily stopping the feeding action of the feeding means when a piece of wire is cut off, means for forming an end portion of the piece of wire cut off into a grip loop, means for forming the remainder of said piece of wire into an insert ring having end portions overlapping each other, means for assembling the wire, so formed, with its insert ring between a closure disc and closure rim, said assembling means including a turntable having a plurality of operation stations and a rockable arm for carrying cover parts to an operation station, said arm being radially movable relatively to the turntable so as to be movable to and from the operation stations as required, and members adjacent one of said stations for conducting temperature-altering fluid to the can cover parts to be soldered and cooled.

5. Apparatus according to claim 4 and a common conduit for supplying heat-altering fluid to a plurality of said fluid conducting members.

6. Apparatus for the production of can covers having outer rims and inner closure discs separable from the rim by tearing a rip-wire from between said rim and disc, comprising means for feeding said wire from a roll of supply wire; means for cutting off pieces of said wire of predetermined length; means for temporarily stopping the feeding action of the feeding means when a piece of wire is cut off; means for forming an end portion of the piece of wire cut off into a grip loop; said loop-forming means comprising a fixed jaw, a revoluble jaw, and a movable shaping member, means for moving said movable shaping member against said wire to press said wire against said fixed and revoluble jaws to form said wire into a half-circle, means for then moving said revoluble jaw around said movable shaping member to press said wire against said shaping member and complete the loop, a clamp for receiving the end of the wire, means for rotating said clamp to wind the wire about itself at the end of said loop; means for forming the remainder of said piece of wire into an insert ring having end portions overlapping each other, means for assembling the wire, so formed, with its insert ring between a closure disc and closure rim, and means for soldering said insert ring between said disc and rim.

7. Apparatus for the production of can covers having outer rims and inner closure discs separable from the rim by tearing a rip-wire from between said rim and disc, comprising means for feeding said wire from a roll of supply wire; means for cutting off pieces of said wire of predetermined length; means for temporarily stopping the feeding action of the feeding means when a piece of wire is cut off; means for forming an end portion of the piece of wire cut off into a grip loop; means for forming the remainder of said piece of wire into an insert ring having end portions overlapping each other, said ring-forming means including a disc having a central opening within which the means for forming the grip loop is disposed, said disc having an external peripherally extending groove, means for rotating said disc periodically, means external of said disc for engaging the wire to press it into said groove when said disc rotates, means for rotating said cover rim, means for spraying said rim and wire with solder flux as it rotates; means for stripping the wire from the loop-forming means and transferring it into the cover rim; means for spraying said rim and wire with solder flux; means for inserting the cover disc in said cover rim and wire; means for heating the joint formed by said rim, wire and disc to solder the joint, and means for blowing cooling air on said joint.

8. Apparatus for the production of can covers having outer rims and inner closure discs separable from the rim by tearing a rip-wire from between said rim and disc, comprising means for feeding said wire from a roll of supply wire; means for cutting off pieces of said wire of predetermined length; means for temporarily stopping the feeding action of the feeding means when a piece of wire is cut off; means for forming an end portion of the piece of wire cut off into a grip loop, said loop-forming means comprising a fixed jaw, a revoluble jaw, and a movable shaping member, means for moving said movable shaping member against said wire to press said wire against said fixed and revoluble jaws to form said wire into a half-circle, means for then moving said revoluble jaw around said movable shaping member to press said wire against said shaping member and complete the loop, a clamp for receiving the end of the wire, means for rotating said clamp to wind the wire about itself at the end of said loop, a ring-forming disc surrounding said loop-forming means, said loop having a central recess, a radially extending outwardly opening slot, and a peripheral groove, an abutment ring encompassing said ring-forming disc, means for rotating said ring-forming disc so that the wire is pressed into said groove by the abutment ring, means for assembling the wire, so formed, with its insert ring between a closure disc and closure rim, and means for soldering said insert ring between said disc and rim.

9. Apparatus for the production of can covers having outer rims and inner closure discs separable from the rim by tearing a rip-wire from between said rim and disc, comprising means for feeding said wire from a roll of supply wire; means for cutting off pieces of said wire of predetermined length; means for temporarily stopping the feeding action of the feeding means when a piece of wire is cut off; means for forming an end portion of the piece of wire cut off into a grip loop, said loop-forming means comprising a fixed jaw, a revoluble jaw, and a movable shaping member, means for moving said movable shaping member against said wire to press said wire against said fixed and revoluble jaws to form said wire into a half-circle, means for then moving said revoluble jaw around said movable shaping member to press said wire against said shaping member and complete the loop, a clamp for receiving the end of the wire, means for rotating said clamp to wind the wire about itself at the end of said loop, a ring-forming disc surrounding said loop-forming means, said loop having a central recess, a radially extending outwardly opening slot, and a peripheral groove; an abutment ring encompassing said ring-forming disc, means for rotating said ring-forming disc so that the wire is pressed into said groove by the abutment ring; means for moving said ring-forming disc axially with respect to the abutment ring after formation of the insert ring to release the rip-wire within the can cover rim within which it expands under its own resilience and remains seated therein, means for inserting a closure disc within the insert ring and cover rim, and means for soldering said insert ring between said disc and rim.

CHARLES HUMMEL.